United States Patent [19]

Jones et al.

[11] 4,118,545

[45] Oct. 3, 1978

[54] SODIUM SULPHUR CELLS

[75] Inventors: Ivor Wynn Jones; Graham Robinson, both of Chester, England

[73] Assignee: Chloride Silent Power Limited, London, England

[21] Appl. No.: 768,929

[22] Filed: Feb. 15, 1977

[30] Foreign Application Priority Data

Feb. 18, 1976 [GB] United Kingdom ............... 6377/76

[51] Int. Cl.$^2$ .......................................... H01M 10/00
[52] U.S. Cl. .................................................. 429/104
[58] Field of Search ............................... 429/101–104, 429/30, 31, 209, 191, 233, 235, 245

[56] References Cited

U.S. PATENT DOCUMENTS

| 3,841,912 | 10/1974 | Kagawa et al. | 429/104 |
| 3,985,575 | 10/1976 | Ludwig | 429/103 |
| 3,993,503 | 11/1976 | Ludwig | 429/103 |

Primary Examiner—Anthony Skapars
Attorney, Agent, or Firm—Beveridge, DeGrandi, Kline & Lunsford

[57] ABSTRACT

In a sodium sulphur cell having a porous matrix forming an electronic conductor in the cathodic region and extending between the surface of the solid electrolyte and a cathode current collector, this matrix is a composite comprising a first material formed of graphite or carbon of a material coated with graphite or carbon, which first material is intimately mixed with a second material, such as alumina fibres, which is more easily wetted by the polysulphides than is the first material.

15 Claims, 4 Drawing Figures

DISTRIBUTION OF CELL CAPACITIES AS A FUCTION OF CYCLE LIFE.

SODIUM SULPHUR CELLS

BACKGROUND OF THE INVENTION

1. Field of the Invention

This invention relates to a cathodic electrode

2. Prior Art

This invention relates to a cathodic electrode structure for sodium sulphur cells.

In a sodium sulphur cell, a solid electrolyte material separates molten sodium, forming the anode, from a sulphur/polysulphide cathodic reactant. In such a cell the solid electrolyte is a material, such as beta alumina, which conducts sodium ions. On discharge of the cell, the sodium gives up electrons at the anodic interface of the solid electrolyte. The sodium ions pass through the solid electrolyte into the cathode adjacent to the electrolyte. The electrons pass through the sodium to the anode current collector and thence around an external circuit to a cathode current collector, e.g. a carbon or graphite tube or rod, in the cathodic reactant. The electrons must pass from this cathode current collector to the region of the cathode adjacent the surface of the solid electrolyte where they react with the sulphur to form sulphide ions. The sulphide ions and sodium ions form a polysulphide. The electronic conductivity of molten sulphur is low and hence it is the practice to pack the cathodic region with a fibrous carbon or graphite material which provides the required electronic conductivity.

The present invention is concerned with modifying the wetting properties of the fibrous packing to ensure the most efficient utilisation of the reactants. When the cell is being recharged it is essential that all sodium ions in the sulphur electrode have access to the electrolyte, either by direct contact between polysulphide and electrolyte or by ionic conduction through adjacent regions of polysulphide. In practice the fibrous material acts as a capillary system and influences the distribution of reactants, and in the fibrous materials commonly used it is possible for some polysulphide to become isolated from the electrolyte surface. This results in incomplete utilisation, so that the capacity of the cell gradually decreases on successive cycles of charge and discharge.

U.S. Pat. Nos. 3,966,492 and 3,985,575 disclose arrangements in which part of the cathodic region is filled with a graphite film matrix and part by a material which is more easily wetted by polysulphides; such structures however do not solve the problem of pockets of polysulphides collecting in regions remote from the electrolyte, i.e. when the greatest problem arises.

SUMMARY OF THE INVENTION

According to the present invention, in a sodium sulphur cell having the cathodic region between a solid electrolyte and a cathode current collector containing a porous packing to form an electronic conductor, this packing comprises a first material formed of graphite or carbon or of a material coated with graphite or carbon intimately mixed with a second material which is chemically inert to sulphur/polysulphides forming the cathodic reactant but which at the operating temperature of the cell is more easily wetted by the polysulphides than is the carbon fibre material.

The first material would generally be carbon or graphite material but it might be a material having a carbon or graphite coating as described in the specification of co-pending British Patent Application No. 4534/77. From the point of view of surface characteristics, e.g. wettability, the first material has a carbon or graphite surface and, for convenience in this specification, will be referred to as carbon or graphite material.

The composite material, because of the presence of said second material, is more effectively impregnated by the two-phase mixture of sulphur and polysulphides present in a partly-charged cell than the unmodified fibrous carbon material would be. With the mixed material, the carbon or graphite is in direct contact with the cathodic reactant and can thus act in a similar manner to conventional graphite felt. On discharge of the cell it provides the required electronic current path between the cathode current collector and the regions near the surface of the electrolyte where the sulphide ions have to be formed. These sulphide ions react with the sodium ions passing through the electrolyte to form a polysulphide. When the cell is charged, the current is in the reverse direction; sulphide ions are converted to sulphur and sodium ions are removed from the sulphur electrode at the electrolyte surface. The graphite or carbon fibres in the composite transfer electrons from the reaction zone to the cathode current collector. However, for recharge to proceed, it is necessary to replace liquid that has been removed from the region close to the electrolyte by transferring polysulphide to that region from elsewhere; otherwise pockets of polysulphide may be isolated. The second material in the composite which makes the packing more easily wetted by the polysulphide, assists in this transfer of the polysulphide by capillary action. These have to be transferred away from the neighbourhood of the electrolyte on discharge of the cell and transferred to this region on charging of the cell.

The use of a composite material in the cathodic packing thus at least partially separates the two functions of providing electronic conductivity and of facilitating transfer of cathodic reactant by a wicking action. The chemically inert second material in the composite can now be chosen for its properties as a wicking agent for transfer of the reactant without regard to its electrical conductivity. It thus becomes possible to use electrically insulating materials such as aluminium oxide, conveniently in fibre form. The two materials can be intimately mixed so that the desired electrochemical reaction can take place of the whole of the region where the packing is in the neighbourhood of the electrolyte but liquid mass transfer is facilitated throughout the region filled by the packing. The use of two materials in the composite packing also has the advantage that it improves the transfer of the polysulphides compared with the use of a conventional carbon or graphite felt.

The main advantage of the composite packing material as described above compared with conventional carbon or graphite felt packing lies in the significant improvement in the capacity retention of the cell over prolonged periods of charge-discharge cycling. Cells with carbon fibre packing typically have a charge capacity which gradually falls off to about 60% of the theoretical value for the conversion of the sulphur charge to sodium trisulphide over about 100 cycles of charge and discharge. Cells built according to the present invention have been found to maintain approximately 90% of theoretical capacity over 250 cycles of charge and discharge. In a cell using a carbon felt matrix, it has been found that, over prolonged periods of cyclic charge and discharge, pockets of polysulphide material collect. These inhibit the full charging of the cell to its theoretical capacity. In the cell of the present invention, the improved liquid mass transfer of the polysulphides prevents or at least reduces this problem of polysulphide material accumulating where it cannot be utilised on charging.

The porous packing is preferably fibrous and conveniently the graphite or carbon is of fibrous form; in some cases however powdered carbon or a foamed carbon material of an open porous structure may be used. The second material is preferably an inorganic material, and is preferably fibrous although powdered material or other porous material may be employed.

The carbon or graphite and the second material are preferably intimately dispersed. This ensures good liquid transfer characteristics throughout the whole body of the cathode matrix.

Improvement in performance is obtained over a wide range of proportions of said second material to the graphite or carbon. This proportion may be in the range of 5% to 55% by weight. It has been found that in some cases, small proportions give an advantage in capacity retention. It has been found however that more consistent improvement is obtained with between 30% and 55% of the second material. It is preferred to use about 50% of the second material. Increasing the proportion above this amount would increase the resistance of the cell or decrease the energy density for only a slight, perhaps negligible improvement in capacity retention.

Many inorganic materials are suitable as said second material. Many oxide and sulphide materials are chemically inert to the sulphur/polysulphides forming the cathodic reactant in a sodium sulphur cell. As indicated above, it is preferred to use a fibrous material and this leads to consideration of those oxide materials which are available in fibre form, for example glass fibres or aluminosilicate. Alumina or zirconia fibres are particularly convenient to use.

If loose fibres are used, the fibres of the two materials may be mixed together in the required proportions and then used as a packing in the cell. It is often conveninet however, in order to facilitate handling, for such loose fibres to be put in a sandwich between two layers of a thin cloth. Carbon fibre woven cloth is commercially available and is convenient to use. In principle however, a cloth woven of mixed fibres could be used.

In sodium sulphur cells, it is known to use the material known as reticulated vitreous carbon for the cathode matrix. This material is a vitreous carbon and has a reticulated open mesh structure; it has an advantage over carbon or graphite felt in that it is a rigid material. Such material can be used in the cell of the present invention by breaking up fibres of said second material and then impregnating these fibres into the carbon foam before impregnating the combined structure with sulphur. The broken-up fibres of the second material may be impregnated into the foam using a liquid carrier which is subsequently evaporated.

DESCRIPTION OF THE PREFERRED EMBODIMENTS

Figure 1:
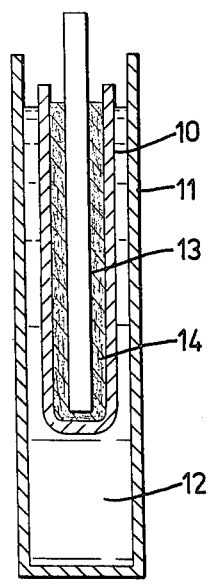
FIG. 1 illustrates diagrammatically a sodium sulphur cell.

FIG. 1 illustrates diagrammatically a sodium sulphur cell having a solid electrolyte tube 10, formed of beta-alumina, which tube is closed at one end and supported in a metal case 11 constituting the anode current collector. Sodium 12 fills the annular space around the electrolyte tube 10. Inside this tube is a graphite rod 13 forming the cathode current collector. The space between the rod 13 and electrolyte tube 10 is packed with a porous structure 14 forming an electronically conductive matrix which is filled initially with sulphur. The cell is operated at a temperature, typically 300° C. to 400° C., at which the sodium and sulphur are molten.

The present invention is concerned more particularly with the porous structure 14. In this embodiment, this structure is formed by packing into the annular region an intimate mixture of loose fibres of graphite and alumina. Staple fibres are used of a length, typically between 0.1 and 2 mm and preferably between 0.25 and 0.5 mm and of a few microns diameter. For the alumina fibres it is preferred to use a polycrystalline alumina in a transitional form with a small percentage of other inorganic oxides as crystal phase stabilisers, for example, material sold under the Trade Mark "Saffil". This material is microporous and has a large surface area.

If mixed fibres are employed, they may be needled to form a composite felt similar in form to the carbon and graphite felts already known for use in sodium sulphur cells. Preferably this mixed fibre material may readily be formed into a felt havinng a density about twice that of conventional carbon or graphite felts; typically a density of 0.24 to 0.34 g cm$^{-3}$ may be used compared with the density of 0.12 to 0.17 g cm$^{-3}$ of conventional carbon or graphite felts.

The composite felt may be inserted into an annular cathodic region of a sodium sulphur cell in the known way, for example in the form of washers, or a sheet bent into a cylinder or wrapped helically within or around the electrolyte tube or in the form of strips, preferably of trapezoidal section, laid over the surface of the electrolyte tube parallel to the axis thereof. The matrix material may be impregnated with molten sulphur after insertion in the cell or an electrode assembly may be formed of the matrix material impregnated with sulphur, which assembly is then inserted in the cell.

If mixed short fibres are used, as described above, the loose mixture of fibres may be packed into the cell before sulphur impregnation. The loose fibres may however be moulded with molten sulphur into the required shape for incorporation into the electrode and cooled to solidify the assembly before putting this assembly into the cell.

Figure 2:
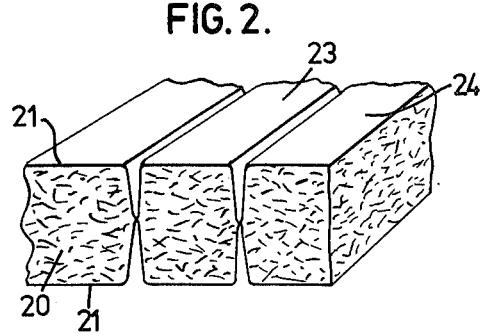
FIG. 2 is a perspective diagram showing a part of a cathode matrix structure in one embodiment of the invention.

If loose fibres are used, it is convenient to sandwich the mixed fibres between layers of a thin cloth, conveniently a woven cloth. FIG. 2 illustrates such an assembly with mixed fibres 20 sandwiched between thin sheets of a woven cloth 21. The sandwich typically is 1 to 10 mm thick. This facilitates handling of the matrix assembly and, in particular, facilitates compression of the fibres when packing the assembly into a cell.

Figure 3:
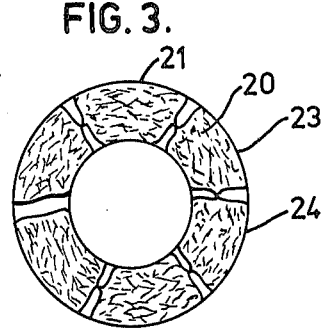
FIG. 3 is a diagram illustrating how the structure of FIG. 2 is formed into an annular shape.

By sandwiching the loose fibres between cloth, the structural integrity of a needled felt can be obtained. In some cases however it may be preferred to needle the composite. Conveniently as shown in FIGS. 2 and 3, this composite is formed into a number of elongate elements, such as elements 23, 24, joined along their length by the layers of cloth 21 so that the assembly can be formed into an annular unit to fit within the cell. The assembly may be impregnated with sulphur before or after putting it in the cell.

The woven cloth 21 may be formed from carbon fibres or metallic fibres or of an insulating material such as the alumina material sold under the Trade Mark "Saffil" or it may be formed of a mixture of materials.

In another construction, the whole of the matrix is built up of a woven structure of mixed fibres.

With a packing of loose fibres formed of graphite and alumina fibres in equal proportions by weight, it has been found that all the sulphur is converted to sodium trisulphide in 5 hours discharge and completely reconverted on recharge. It has been found that this performance is reproduced during several months of daily cycling.

It is preferred to use a rather denser packing than is commonly employed for carbon felt packing in a sodium sulphur cell. For example the packing may be compressed to about twice the density of a carbon felt packing thereby giving about the same quantity of electronic conductive material, i.e. carbon, per unit volume with the addition however of the alumina fibres intermingled with the carbon.

Figure 4:
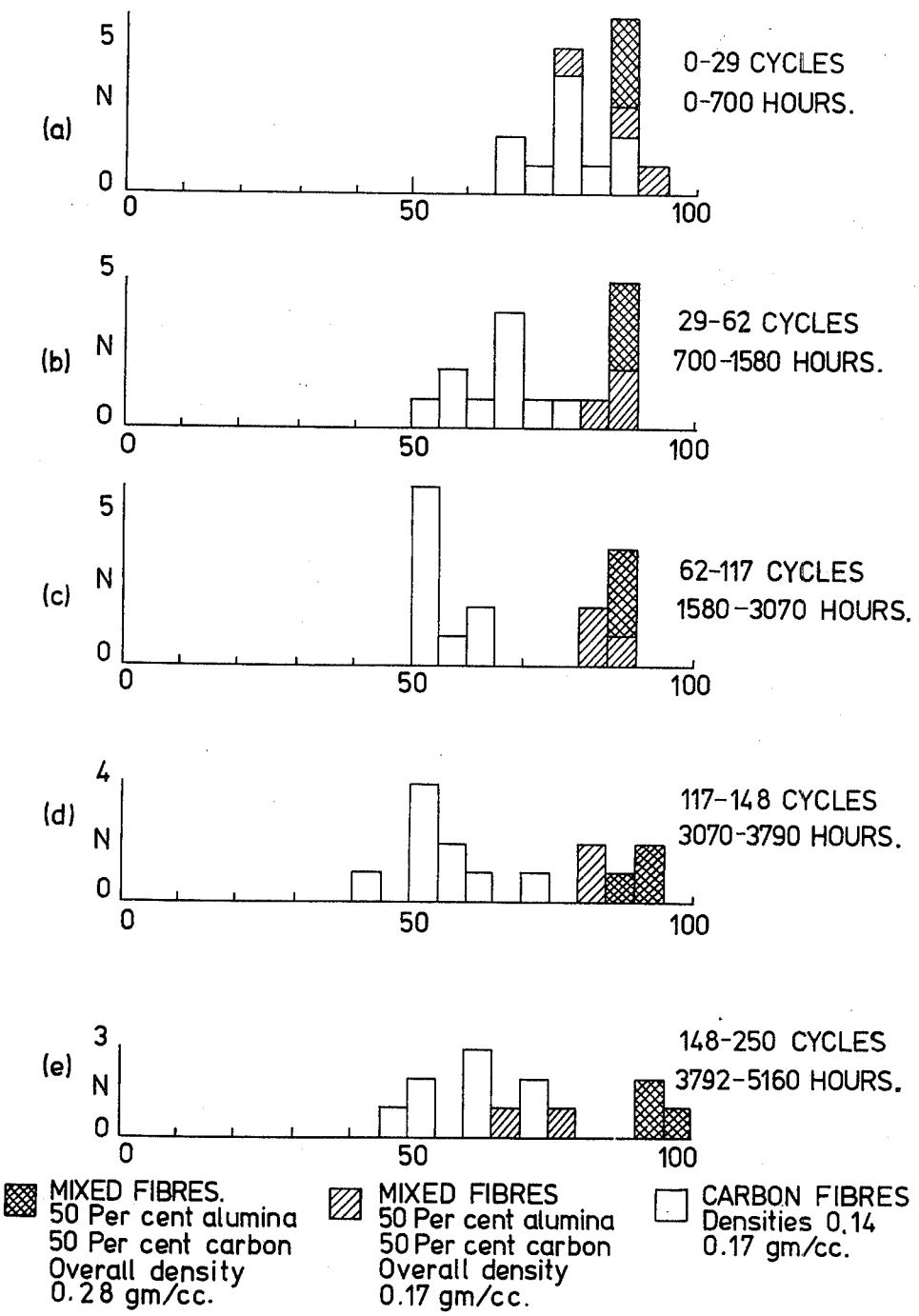
FIG. 4 is a graphical diagram illustrating the improvement in performance obtained using the present invention.

FIG. 4 comprises five graphical diagrams (a), (b), (c), (d) and (e) of histogram form illustrating test results obtained in which the cell capacity of each of a number of sodium sulphur cells (expressed as a percentage of the theoretical capacity represented by the conversion of the sulphur charge to soduim trisulphide) was measured. In each of the five diagrams, the abscissa is the percentage charge capacity and the ordinate N is the number of cells whose time-averaged capacities over the stated time interval were in the appropriate range. Diagram (a) covers the first 700 hours of the test, during which 29 complete cycles of charge and discharge of the cells was carried out. Diagram (b) as marked thereon, shows the situation after 1580 hours, i.e. a total of 62 cycles of charge and discharge. Diagram (c) is for 117 cycles (3070 hours), diagram (d) for 148 cycles (3790 hours) and diagram (e) for 250 cycles (5160 hours). Three types of cell were tested. Ten cells had conventional carbon fibre packing with a density of 0.14 to 0.17 gm/cc. Three cells had mixed fibre material as described above of 50% carbon, 50% alumina packed to a density of 0.17 gm/cc and three cells had the same mixed material but packed to a density of 0.28 gm/cc. The carbon fibre material in the reference sample of ten cells containing carbon fibre only as the packing was graphite felt supplied by Le Carbone or Thornel supplied by Union Carbide.

As will be seen from FIG. 4, the charge capacity of the cells with carbon fibre matrix material fell off substantially as the testing proceeded. The cells with mixed fibre material however substantially retained their charge capacity. In particular, the cells with the more densely packed material all had 90% or more of the theoretical charge capacity at the end of the test.

Similar tests have been carried out with mixed fibre matrix electrodes of the same materials as described above but with 10% and with 30% alumina content; these tests also showed examples of enhanced capacity retention although the improvement was not so marked as with the cells of 50% alumina content in the cathode matrix.

We claim:

1. In a sodium sulphur cell having a cathodic region between a solid electrolyte and a cathode current collector containing a porous packing to form an electronic conductor; the improvement wherein the packing comprises a first material formed of graphite or carbon or of a material coated with graphite or carbon, intimately mixed with a second material which is chemically inert to sulphur/polysulphides forming the cathodic reactant but which at the operating temperature of the cell is more easily wetted by the polysulphides than is the carbon fibre material.

2. A sodium sulphur cell as claimed in claim 1 wherein the first material and the second material are each of fibrous form.

3. A sodium sulphur cell as claimed in claim 1 wherein the first material and the second material each comprise loose fibres intimately mixed.

4. A sodium sulphur cell as claimed in claim 3 wherein the fibres are staple fibres of a length of 0.1 to 2mm.

5. A sodium sulphur cell as clained in claim 3 or claim 4 wherein the fibres are sandwiched between layers of a cloth.

6. A sodium sulphur cell as claimed in claim 5 wherein the cloth is a woven cloth.

7. A sodium sulphur cell as claimed in claim 5 wherein the cloth is a carbon fibre cloth.

8. A sodium sulphur cell as claimed in claim 1 wherein the packing is in the form of a rigid reticulated structure of vitreous carbon which constitutes the first material and which is impregnated with short lengths of the second material in fibre form.

9. A sodium sulphur cell as claimed in claim 1 wherein the packing is a woven cloth formed of fibres of the first said materials.

10. A sodium sulphur cell as claimed in claim 1 wherein the second material is an oxide material.

11. A sodium sulphur cell as claimed in claim 10 wherein the second material is a glass.

12. A sodium sulphur cell as claimed in claim 10 wherein the second material is alumina.

13. In a sodium sulphur cell having a cathodic region between a solid electrolyte and a cathode current collector, which region contains a porous electronically conductive packing extending between a surface of the electrolyte and the current collector, the packing being impregnated with sulphur/polysulphides constituting a cathodic reactant; the improvement wherein the packing comprises first and second materials, the first material comprising a matrix of electronically conductive material, at least the surface of the matrix material comprising carbon or graphite and the second material being a fibrous material chemically inert to the cathodic reactant but which is more easily wetted by the polysulphides than the first material, the packing of mixed material extending between the electrolyte and the current collector.

14. A sodium sulphur cell as claimed in claim 13 wherein the first material comprises a fibrous graphite or carbon material.

15. A sodium sulphur cell as claimed in claim 13 wherein the second material comprises alumina fibres.

* * * * *